United States Patent [19]

Eklund et al.

[11] Patent Number: 4,610,761

[45] Date of Patent: Sep. 9, 1986

[54] PAPER THAT CONTAINS CHEMICALLY SUBSTITUTED CELLULOSE

[75] Inventors: Dan Eklund, Grankulla; Jukka Erkkilä; Matti Ingman, both of Säkylä ; Anders Lassus, Åbo; Kauko Peltonen; Kari Saarinen, both of Säkylä, all of Finland

[73] Assignee: Lännen Tehtaat Oy, Iso-Vimma, Finland

[21] Appl. No.: 691,564

[22] PCT Filed: May 21, 1984

[86] PCT No.: PCT/FI84/00040

§ 371 Date: Dec. 19, 1984

§ 102(e) Date: Dec. 19, 1984

[87] PCT Pub. No.: WO84/04553

PCT Pub. Date: Nov. 22, 1984

[30] Foreign Application Priority Data

May 19, 1983 [FI] Finland ................................. 831767

[51] Int. Cl.[4] ............................................. D21H 5/12
[52] U.S. Cl. .................. 162/157.6; 162/158; 162/182
[58] Field of Search ........... 162/72, 157.6, 166, 162/167, 182, 158; 8/181, 195; 427/395

[56] References Cited

U.S. PATENT DOCUMENTS

| 2,407,376 | 9/1946 | Maxwell | 162/166 |
| 2,624,686 | 1/1953 | Kamlet | 162/166 |
| 3,773,612 | 11/1973 | Avis | 162/166 |

*Primary Examiner*—Peter Chin
*Attorney, Agent, or Firm*—Burns, Doane, Swecker & Mathis

[57] ABSTRACT

A paper material has been invented that contains cellulose substituted by means of N-methylol compounds. As N-methylol compounds may be used, e.g., reaction products of urea, glyoxal, and formaldehyde, methylolated melamines, and N-methylol-acrylamide copolymers. The paper is manufactured best by impregnating paper with an aqueous solution or dispersion of a N-methylol compound and by drying it at 130° to 200° C. in order to produce condensation. Papers in accordance with the invention have good properties of strength against decomposition and wet strength, which properties can be adjusted readily by varying the degree of substitution or cross-linking of the cellulose. The papers are particularly well suitable, e.g., for the manufacture of plant-growing pots and corrugated fibreboard.

14 Claims, No Drawings

PAPER THAT CONTAINS CHEMICALLY SUBSTITUTED CELLULOSE

The invention is concerned with paper that contains chemically substituted cellulose. The paper in accordance with the invention has particularly good rot-proof and wet-strength properties. It can be used, e.g., as a raw-material for plant pot systems.

Rot-proof papers are used for a great number of purposes. In agriculture and forestry, they are used, e.g., as production material for plant pot systems.

The present-day production methods are based thereon that varying quantities of PVA fibres are mixed into the paper, by means of which fibres the desired strength against decomposition is obtained for the paper. A drawback of this method is the relatively high cost of the said fibres. It would be preferable to use such a rot-proof paper as is based exclusively on natural fibres.

By adding anti-rot agents to the paper, it is possible to provide a certain, but not sufficient, strength against decomposition. Possible toxic effects of anti-rot agents also restrict their more extensive use.

In the literature, there are several implications to the effect that by modifying the chemical structure of cellulose it is possible to provide prolonged strength against decomposition. For example, "Microbial decomposition of cellulose", Siu, R. G. H., Reinhold Publishing Corporation, New York (1951), gives a theoretical basis for this method. By substituting the hydrogen groups in the hydroxyl groups of cellulose with other groups, compounds of the formula

$$(C_6H_7O_2(OH)_{3-y}(OR)_y)_x \quad \text{I}$$

are obtained, in which formula
R = desired modification,
x = DP; length of the molecule chain (number of glucose units),
y = DS; degree of substitution.

In order to obtain a sufficient strength against decomposition, it is necessary that the O-R linkage is as stable as possible, whereat the hydrolysis, if any, takes place very slowly.

In view of the strength properties of the paper, it is preferable that the reaction conditions are as mild as possible when these derivatives are being prepared.

Now it has been discovered that a paper that contains cellulose fibre chemically substituted with N-methylol compounds has an excellent strength against decomposition and wet strength. In this connection, the expression paper also means paperboard, board, and other, similar products.

Preferable N-methylol compounds that can be concerned are reaction products or urea, glyoxal, and formaldehyde, such as dimethylol-dihydroxy-ethylene-urea (DMDHEU), monomethylol-dihydroxy-ethyleneurea (MMDHEU), dihydroxy-ethyleneurea (DHEU), and acetylene-diureas. Also methylolated melamines and N-methylol-acryl-amide-copolymers can be used.

It has been noticed that all of the above compounds form stable linkages with cellulose. When cyclic N-methylol compounds are used, it is advantageous that a carbon atom placed as a neighbouring atom of a nitrogen atom has a nitrogen or oxygen atom as its neighbouring atom. This is the case, e.g., in the case of dimethylol-dihydroxy-ethyleneurea and of methylolated melamine.

The paper in accordance with the invention is preferably prepared by surface-treating conventional paper. When high temperatures or, in particular, a long reaction time is used, it is recommended to use surface treatment taking place in a unit separate from the paper machine. In principle, it is also possible to add the agents as early as in the size press of the paper machine and to perform mere condensing in a separate unit.

In order to produce the reaction, an elevated temperature and evaporation of the water generated in the reaction are required. N-methylol compounds additionally require a catalyst in order to react with cellulose. Latent or potential acids can function as a catalyst. A typical catalyst is $MgCl_2$; an appropriate catalyst concentration is, e.g., 20 percent by weight as calculated from the reactive compound. The temperature may be, e.g., between 130° C. and 200° C., preferably between 140° C. and 180° C. The condensation time required depends on the temperature. If a strongly acid catalyst and a high temperature are used, a very short condensation time can be obtained.

By varying the concentrations of reactive agents in the solution or dispersion, it is, in a simple way, possible to adjust the quantity of reactive agent absorbed to the paper and thereby to affect the level of the strength against decomposition of the paper. An appropriate dosage quantity is, depending on the desired strength against decomposition, 1 to 10% of N-methylol compound, calculated from the dry solids content of the paper.

By using difunctional or polyfunctional reagents, it is possible to produce cross-linkages, which, besides the strength against decomposition, also give the paper an excellent wet strength.

The raw-materials of the papers in accordance with the invention are of relatively low cost, the papers can be manufactured under quite mild conditions, and, since only reagents soluble or dispersed in water are used in the production, the production is also easy from the point of view of work hygiene.

The papers in accordance with the invention have good strength against decomposition and good wet strength, and the degree of these properties can also be adjusted easily by varying the degree of substitution or cross-linkage of the cellulose. The N-methylol compounds also increase the dimensional stability and rigidity of the paper products, which is advantageous, e.g., in the production and use of corrugated fibreboard.

The papers can be used in principle for all applications in which good strength against decomposition or good wet strength is required. As examples should be mentioned packaging materials, such as sacks, corrugated fibreboards, boxes and barrels, paper strings, and in particular plant pots and plant-growing bases.

When paper sacks, strings, barrels, and other products are being produced, it is possible either to treat the paper out of which the product concerned will be manufactured, or to shape the said product ready and to treat the complete product. The treatment is, however, always the same. The paper is impregnated with a solution or dispersion containing a N-methylol compound, whereupon the drying and the condensation that requires heat take place. As an intermediate mode of production may be considered a production in which the paper is impregnated, dried, the product concerned is shaped, and the complete product is treated with heat.

It is essential in the production of all of these products that the degree of sizing of the paper is low, that rosin sizes are avoided, and that the paper is, if possible, made of conifer cellulose. In this way, no high concentrations of N-methylol compounds are required in order to provide sufficient strength against decomposition. On the other hand, brittleness of paper and deterioration of other paper-technical properties are avoided.

Since hardwood cellulose contains plenty of carboxyl groups, during its modification ester bonds are also formed, which are not equally stable as ether bonds are. When portions containing hardwood pulp are prepared into conifer-pulp-based paper, a paper is obtained which decomposes by forming holes, whereas the skeleton of the paper, yet, still remains solid. This can be taken advantage of in plant pot systems.

Such a paper can be manufactured, e.g., by into bleached pine sulfate pulp, under acid conditions, mixing rosin-sized reject that contains 50 to 100 percent by weight of birch fibre as gently pulped. Out of the pulp prepared in this way, a paper is obtained that contains flocs of hardwood fibres in a matrix of conifer fibres, provided that it is taken care that the flocs cannot be disintegrated in pumps or agitators.

A paper which decomposes by forming holes can also be prepared by applying substance containing carboxyl groups on certain spots of the paper. On these spots N-methylol compound will react only with this "protective substance" and cellulose will remain unsubstitued. A suitable substance is e.g. carboxymethyl cellulose (CMC). It is suitable to use an aqueous solution of low viscosity in order to get the absorption of the substance sufficient. A suitable CMC concentration is e.g. 7%.

The substance containing carboxyl groups can be added into the paper e.g. with a screen cylinder. After the aqueous solution has been added the water is evaporated by drying. Thus the substance adheres to the fibres and spreading of the substance outside of the spots is avoided.

In the screen cylinder method the size and amount of the spots are more easily regulated than in the floc method.

In the manufacture of rot-proof corrugated fibreboard it is preferable that both the corrugating medium (fluting) and the facing are treated with a N-methylol compound before corrugating and joining of the layers together. In this way a sufficient impregnation is also obtained for the middle layer of the corrugated fibreboard. The glue for corrugated fibreboard must be waterproof. Such a glue is, for example, starch paste to which synthetic resin, such as urea-formaldehyde or resorcinol-formaldehyde, has been added. The condensation of the N-methylol compound takes suitably place after corrugation.

As raw-materials of corrugated fibreboard, it is possible to use the facing and fluting board qualities available at present. It is, however, important that the sizing degree of the facing is as low as possible, which facilitates the impregnation. There is also a risk that side reactions occur between carboxyl-containing resin sizes and the N-methylol compound. The present-day corrugating medium is often made of semi-chemical hardwood pulp. Such a quality, however, contains an abundance of carboxyl groups, because of which it is preferably that, e.g., corrugating medium made of conifer (or perhaps wastepaper) fibres is used.

The strength of the papers in accordance with the invention was tested by fermenting them for three days in a solution containing
2.5 l buffer solution
25 g "Meicelase" powder (cellulase enzyme)
0.7 g "Triton" (antifoam agent)
31 g citric acid
40 g $Na_2HPO_4 + 2H_2O$ With papers impregnated with DMDHEU, prolonged decomposition tests were also performed (Example 2). The samples were placed into boxes which were filled with soil, pH 4.8, conductivity 4.7, and concentrations of nutrient agents (mg/l): Ca 830, K 117, F 20, Mg 283, and N 10. The boxes were kept in a "Potma" incubator at 30° C. and in a relative humidity of 75%.

The tensile strengths were determined in accordance with the SCAN standards by means of an "Alwetron" apparatus.

EXAMPLE 1

MMDHEU-impregnated paper

The paper was impregnated with solutions of different concentrations containing monomethylol-dihydroxyethyleneurea (urea:glyoxal:formaldehyde=1:1:1), wherein as catalyst was used $MgCl_2 \times 6H_2O$ (20% of the weight of the resin), and the paper was dried at about 150° C. for 10 minutes. Out of the paper, the increase in weight on impregnation as well as the tensile strength as wet and as dry before and after the fermentation were measured.

| Paper | Increase in weight (%) on impregantion | (N) Tensile strength dry before ferm. | (N) Tensile strength dry after ferm. | (N) Tensile strength wet before ferm. | (N) Tensile strength wet after ferm. |
|---|---|---|---|---|---|
| Bleached pine sulfate SR 25 | 28.65 | 111.4 | 84.0 | 52.7 | 60.3 |
| Bleached pine sulfate SR 25 | 11.80 | 106.5 | 80.4 | 77.3 | 44.8 |
| Bleached pine sulfate SR 25 | 4.92 | 97.6 | 92.8 | 39.0 | 30.1 |
| Unbleached birch sulfate SR 25 | 34.48 | 79.7 | 74.4 | 58.2 | 43.5 |
| Unbleached birch sulfate SR 25 | 14.85 | 86.9 | 65.8 | 63.2 | 21.9 |
| Unbleached birch sulfate SR 25 | 6.15 | 77.9 | 53.3 | 55.2 | 9.0 |

EXAMPLE 2

Paper impregnated with DMDHEU

Papers were impregnated with solutions containing 2 to 8% of dimethylol-dihydroxyethyleneurea ($MgCl_2$ as catalyst) for 10 s at 25° C. and dried for 10 min at 160° C.

| Paper | Increase in weight (%) on impregnation | Tensile strength (N) dry before ferm. | Tensile strength (N) dry after ferm. | Tensile strength (N) wet before ferm. | Tensile strength (N) wet after ferm. | Increase in weight (%) on impregnation | Dry tensile strength (N) after decomposition days | 21 days | 35 days |
|---|---|---|---|---|---|---|---|---|---|
| Bleached pine sulfate SR 25 | 4.98 | 95 | 73 | 70 | 40 | 10.60 | 59 | 48 | 51 |
| Bleached pine sulfate SR 25 | 2.03 | 94 | 70 | 62 | 38 | | | | |
| Bleached pine sulfate SR 25 | 0.65 | 90 | 13 | 36 | 1.0 | | | | |
| Unbleached pine sulfate SR 25 | 2.97 | 87 | 85 | 75 | 65 | 6.49 | 64 | 25 | 13 |
| Unbleached pine sulfate SR 25 | 0.72 | 105 | 63 | 62 | 12 | | | | |
| Bleached birch sulfate SR 25 | 5.29 | 86 | 56 | 49 | 25 | 10.57 | 13 | 4 | 0 |
| Bleached birch sulfate SR 25 | 2.31 | 69 | 30 | 43 | 7 | | | | |
| Unbleached birch sulfate SR 25 | 6.19 | 78 | 62 | 63 | 18 | 5.74 | 6 | 3 | 0 |
| Unbleached birch sulfate SR 25 | 2.44 | 96 | 16 | 43 | 0.5 | | | | |
| Unbleached spruce sulfite SR 30 | 3.58 | 93 | 66 | 64 | 56 | 7.02 | 78 | 27 | 18 |
| Unbleached spruce sulfite SR 30 | 0.66 | 89 | 76 | 50 | 36 | | | | |
| Unbleached spruce sulfite SR 30 | 0.39 | 94 | 88 | 61 | 42 | | | | |
| Bleached pine sulfite SR 50 | | | | | | 9.87 | 66 | 50 | 32 |

EXAMPLE 3

Paper impregnated with urea-glyoxal resin (DHEU)

Impregnated with urea-glyoxal resin (1:1), dried for 10 min. at about 150° C.

| Paper | Increase in weight (%) on impregnation | Tensile strength (N) dry before ferm. | Tensile strength (N) dry after ferm. | Tensile strength (N) wet before ferm. | Tensile strength (N) wet after ferm. |
|---|---|---|---|---|---|
| Bleached pine sulfate SR 25 | 19.17 | 87 | 59 | 56 | 3.6 |
| Bleached pine sulfate SR 25 | 8.40 | 96 | 41 | 62 | 2.5 |
| Bleached pine sulfate SR 25 | 3.47 | 103 | 17 | 59 | 0.7 |
| Unbleached birch sulfate SR 25 | 25.32 | 103 | 12 | 37 | — |

EXAMPLE 4

Paper impreganted with N-methylol-acrylamide

Impregnated with a solution containing water and latex at the ratio 1:1, the said latex containing 5% methylol-acrylamide and 95% vinylacetate, dried at 130° C. for about 9 min.

| Paper | Increase in weight (%) on impregnation | Tensile strength (N) dry before ferm. | Tensile strength (N) dry after ferm. | Tensile strength (N) wet before ferm. | Tensile strength (N) wet after ferm. |
|---|---|---|---|---|---|
| Bleached pine sulfate SR 25 | 41.7 | 67 | 66 | 27 | 28 |
| Unbleached birch sulfate SR 25 | 50.5 | 74 | 58 | 28 | 19 |

EXAMPLE 5

Paper impregnated with methylolated melamine

The paper was impregnated for 20 s with a solution that contained 80 g/l of methylolated melamine ("Kaurit M-70", Basf) and 8 g/l of MgCl$_2$×6H$_2$O, and it was condensed for about 10 min. at 160° to 170° C.

| Paper | Increase in weight (%) on impregnation | Tensile strength (N) dry before ferm. | Tensile strength (N) dry after ferm. | Tensile strength (N) wet before ferm. | Tensile strength (N) wet after ferm. |
|---|---|---|---|---|---|
| Bleached pine sulfate SR 25 | 6.95 | 76 | 56 | 58 | 13 |
| Unbleached pine sulfate SR 25 | 6.75 | 94 | 58 | 76 | 42 |
| Unbleached birch sulfate SR 25 | 6.87 | 72 | 17 | 49 | 4.0 |
| Unbleached spruce sulfite SR 30 | 8.26 | 95 | 48 | 71 | 14 |

EXAMPLE 6

Bleached pine sulfate paper impregnated with mono-, di-, tri- or tetramethylol-acetylene-diurea The resin was prepared as follows: a mixture of urea, glyoxal, and formaldehyde (2:1:1-4) was diluted to a solution of 0.5 M with water, the pH was adjusted to 8 to 9, and the mixture was allowed to stand for about 5 h.

Paper was impregnated with the solution and dried at about 150° C. for 10 min. The catalyst was MgCl$_2$.6H$_2$O as a quantity of 20% from the weight of the resin.

| Impregnation agent | Increase in weight (%) on impregnation | Tensile strength (N) dry before ferm. | Tensile strength (N) dry after ferm. | Tensile strength (N) wet before ferm. | Tensile strength (N) wet after ferm. |
|---|---|---|---|---|---|
| Monomethylol-acetylene-diurea | 11.78 | 96 | 52 | 51 | 1.8 |
| Dimethylol-acetylene-diurea | 11.40 | 102 | 53 | 58 | 2.1 |
| Trimethylol-acetylene-diurea | 12.45 | 97 | 59 | 59 | 13 |
| Tetramethylol-acetylene-diurea | 13.08 | 113 | 67 | 64 | 23 |
| Untreated | — | 85 | — | 1.6 | — | and dimethylol-di-hydroxyethyleneurea; and (ii) drying the paper at 130° to 200° C.

6. Process for the substitution of cellulose in a paper comprising the steps of (i) adding a substance containing carboxyl groups to the paper on certain spots, (ii) treating the paper with an aqueous solution or dispersion of an N-methylol compound which is a reaction product of urea, glyoxal, and formaldehyde, and which is selected from the group consisting of monomethylol-di-hydroxyethyleneurea and dimethylol-di-hydroxyethyleneurea, said substance containing carboxyl groups preventing substitution at said certain spots; and (iii) drying said paper at 130° to 200° C.

7. Paper as claimed in claim 2, the paper containing spots wherein said cellulose fibres are not substituted with said N-methylol compounds.

8. Paper as claimed in claim 3, the paper containing spots wherein said cellulose fibres are not substituted with said N-methylol compounds.

9. The paper as claimed in claim 1 wherein the content of said N-methylol compound is 1 to 10% of the weight of the paper.

10. The process as claimed in claim 6 wherein said substances containing carboxyl groups is carboxymethylcellulose.

11. A method for increasing the resistance to rot of a paper containing conifer cellulose comprising surface treating the paper with a methylol compound which is a reaction product of urea, glyoxal, and formaldehyde and which is selected from the group consisting of monomethylol-di-hydroxyethyleneurea and dimethylol-di-hydroxyethyleneurea, the surface treating being carried out (i) at a temperature between 130° and 200° C., (ii) in the presence of a catalyst and (iii) such that water generated during the treating is evaporated.

12. The method as claimed in claim 11 wherein said surface treating is carried out at a temperature between 140° and 180° C.

13. The method as claimed in claim 11 wherein said catalyst comprises latent or potential acids.

14. The method as claimed in claim 13 wherein said catalyst is MgCl$_2$.

What is claimed is:

1. Paper comprising a conifer cellulose fibre substituted by means of an N-methylol compound which is a reaction product of urea, glyoxal, and formaldehyde and which is selected from the group consisting of monomethylol-di-hydroxyethyleneurea and dimethylol-di-hydroxyethyleneurea.

2. Paper as claimed in claim 1 wherein the N-methylol compound is dimethylol-dihydroxyethyleneurea.

3. Paper as claimed in claim 2 wherein the content of dimethylol-dihydroxy-ethyleneurea is 1 to 3% of the weight of the paper.

4. Paper as claimed in claim 1, the paper containing spots wherein said cellulose fibres are not substituted with said N-methylol compounds.

5. Process for the substitution of cellulose in a paper comprising the steps of (i) treating the paper with an aqueous solution or dispersion of an N-methylol compound which is a reaction product of urea, glyoxal, and formaldehyde and which is selected from the group consisting of monomethylol-di-hydroxyethyleneurea

* * * * *